Patented Apr. 10, 1923.

1,451,003

UNITED STATES PATENT OFFICE.

WILLIAM H. WOOD, OF SOUTH EUCLID, OHIO.

STORAGE BATTERY.

No Drawing. Application filed March 28, 1921. Serial No. 456,157.

*To all whom it may concern:*

Be it known that I, WILLIAM H. WOOD, a citizen of the United States, residing at South Euclid, in the county of Cuyahoga and State of Ohio, have invented a certain new and useful Improvement in Storage Batteries, of which the following is a full, clear, and exact description.

This invention relates to storage batteries and has for its object the provision of a cheap, simple, and reliable battery which can be shipped and stored indefinitely in dry form without deterioration, and upon filling at any time with electrolyte of the requisite strength become instantly ready for use. Most storage batteries consist of alternate positive and negative plates of active material interpersed with electrically non-conducting separators made of a material which is sufficiently porous to permit electro-chemical action while being substantially immune to corrosion by the electrolyte. The separators generally employed consist of thin sheets of wood, usually rendered porous by sufficient chemical treatment to remove a part at least of the gummy substances, but it has never heretofore been possible to store and ship in the dry form batteries provided with separators of this nature owing to the fact that with the passage of time these separators become so overdried and seasoned as to check and split thereby rendering the battery worthless.

I have discovered that if the porous wood separators be impregnated with suitable water soluble substances which at the same time retain sufficient moisture to prevent over drying of the wood-tissue and also have no injurious effect upon the battery fluid, the same can be assembled in the battery jars in company with the fully formed and charged positive and negative plates and shipped or stored indefinitely without deterioration or sign of electric action, but instantly becoming an active fully charged battery upon pouring a charge of sulphuric acid solution therein. In order to accomplish the described purpose of producing such a "bone dry" storage battery with the use of wooden separators, I subject these separators, immediately upon their original production or before they have been allowed to dry, check, or warp to the action of a solution of the substance selected. This substance must be one which will not interfere with the drying of the separators to a point where no tangible moisture is evident yet without allowing such overdrying as to injure the wood substance and the water retained may be either as water of crystallization or as water of liquefaction; and the substance itself may be any substance which is soluble in the electrolyte, which is not deposited electrolytically, and which does not injure the battery action.

The class of substances which I preferably employ consists of the sulphates of the basic elements standing at least as high as magnesium in the electro-motive-force series, namely: the sulphates of magnesium, lithium, sodium, or potassium; and of all these the one which I prefer and recommend is magnesium sulphate or common "Epsom salts." When a wood separator is impregnated with a solution of this substance its pores becomes filled with crystals of the same containing sufficient water of crystallization to prevent any excessive drying out of the surrounding wood, without at the same time rendering the same noticeably moist; but upon the introduction of an electrolyte consisting of a solution of sulphuric acid in water these crystals immediately dissolve leaving the separator in its desired porous condition, and without injuring the behavior of the battery in any way.

Having thus described my invention what I claim is:

1. A separator element for storage batteries consisting of a sheet of porous wood impregnated with a water soluble salt of a metal which is at least as electropositive as magnesium.

2. A separator element for storage batteries consisting of a sheet of porous wood impregnated with a water soluble sulphate of a metal which is at least as electropositive as magnesium.

3. A separator element for storage batteries consisting of a sheet of porous wood impregnated with magnesium sulphate.

4. A separator element for storage batteries consisting of a sheet of porous wood impregnated with a sulphuric acid salt which occurs in crystalline form, the crystals containing water of crystallization, the base of such salt consisting of a metal which is not deposited electrolytically from aqueous solution.

5. A separator element for storage batteries consisting of a sheet of porous wood whose pores are impregnated with crystals of a salt, which crystals contain water of crystallization, and which salt comprises a base which is not reduced electrolytically from aqueous solution.

6. As an article of manufacture and sale, a dry container adapted to receive electrolyte, alternate, fully formed, positive and negative elements therein, and porous, wood, separators interposed between adjacent elements, said separators being impregnated with a moisture-retaining substance which is soluble in electrolyte and does not enter into chemical reaction with the elements of the battery, the whole adapted to become an active battery immediately upon the introduction of a charge of electrolyte.

In testimony whereof, I hereunto affix my signature.

WILLIAM H. WOOD.